US007232059B2

(12) United States Patent
Peebles

(10) Patent No.: US 7,232,059 B2
(45) Date of Patent: Jun. 19, 2007

(54) VACUUM PICKING SYSTEM

(75) Inventor: John A. Peebles, Dundee (GB)

(73) Assignee: NCR Corporation, Dayton, OH (US)

(*) Notice: Subject to any disclaimer, the term of this patent is extended or adjusted under 35 U.S.C. 154(b) by 169 days.

(21) Appl. No.: 11/006,961

(22) Filed: Dec. 8, 2004

(65) Prior Publication Data

US 2005/0127162 A1 Jun. 16, 2005

(30) Foreign Application Priority Data

Dec. 13, 2003 (GB) ................................ 0328961.8

(51) Int. Cl.
*G06F 17/60* (2006.01)

(52) U.S. Cl. ........................................ 235/379; 902/14

(58) Field of Classification Search ................ 235/379, 235/382, 384, 385; 902/13, 14
See application file for complete search history.

(56) References Cited

U.S. PATENT DOCUMENTS 4,065,118 A 12/1977 Dudley
4,494,743 A * 1/1985 Kushmaul et al. ............ 271/11
4,591,140 A * 5/1986 Illig et al. ...................... 271/11
5,590,790 A * 1/1997 Saunders .................... 209/534
5,915,681 A * 6/1999 Milne .......................... 271/12

FOREIGN PATENT DOCUMENTS

EP 0 851 394 A1 7/1998
WO WO 02/28754 A1 4/2002

OTHER PUBLICATIONS

Patent Abstracts of Japan, vol. 1998, No. 08, Jun. 1998 & JP 10 077130 A (Canon Inc.), Mar. 24, 1998.

* cited by examiner

*Primary Examiner*—Daniel St. Cyr
(74) *Attorney, Agent, or Firm*—Gregory A. Welte

(57) ABSTRACT

A self-service machine, such as an automated teller machine (70), that includes a plurality of vacuum pick mechanisms (10) for picking media (12), such as banknotes, each vacuum pick mechanism (10) including a pump (18), a pickline (20) connected the pump, a drive mechanism for moving the pickline (20) between a media pick position and a media release position, and a motor (33) for driving both the pump (18) and the drive mechanism.

9 Claims, 9 Drawing Sheets

FIG. 4
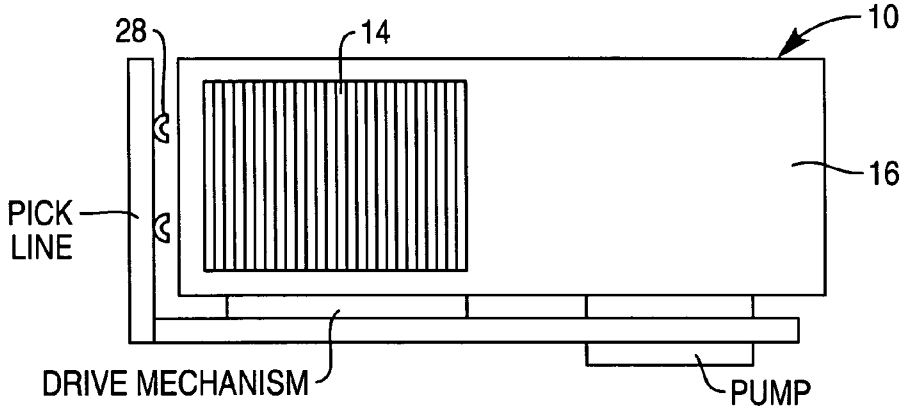
FIG. 7(b)
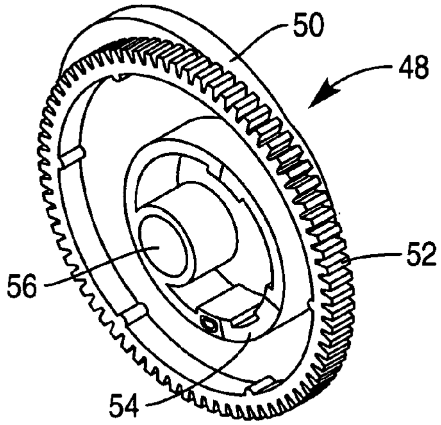
FIG. 7(b)
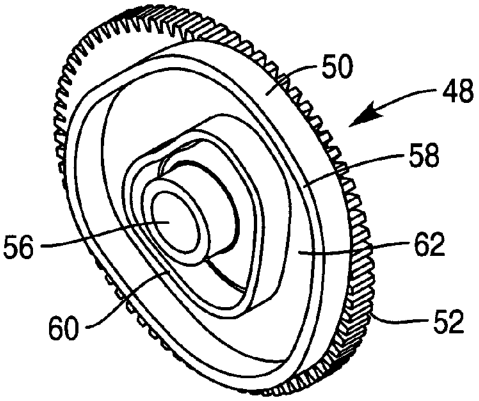
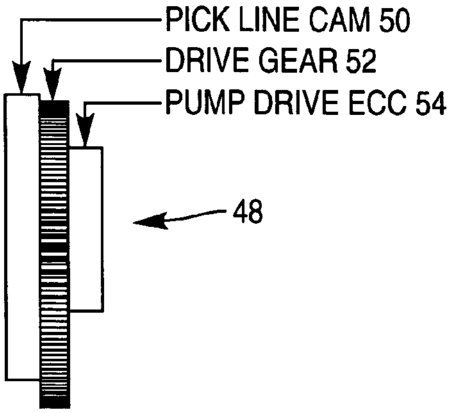
FIG. 7(c)

VACUUM PICKING SYSTEM

BACKGROUND OF THE INVENTION

The present invention relates to a vacuum picking system for picking up and moving sheet media, such as banknotes, and in particular a valveless vacuum picking system. The present invention also relates to a self-service terminal such as an automated teller machine that includes such a system.

Vacuum picking systems are used in automated teller machines for dispensing cash. Most of these include some form of pump mechanism for sucking air through a tube, which tube has a suction pad on its end. When the suction pad is moved into contact with a banknote the suction created by the pump causes the banknote to stick to the pad. This effectively closes the end of the pad, and the tube. Continued action of the pump causes the pressure in the tube to lower, so that the banknote can be securely held in place. Once so secured, the banknote can be moved as and when desired.

Most automated teller machines include a plurality of vacuum picking modules so that different denominations of banknotes can be dispensed. For example, in the UK, typically four modules are provided, two of which may include twenty-pound notes and the other two of which may include ten-pound notes. In order that notes can be dispensed, each module has to have a separate banknote pick-up mechanism, each with its own pickline. FIG. 1 shows one known vacuum-based system, in which each pickline is connected to an individual pump, and each of the pumps is connected to a single AC motor. Associated with each pickline is a solenoid valve for opening or closing the line so that air can be selectively evacuated thereform. Also associated with each line is gearing or other mechanical means (not shown) for moving the end of the pickline into contact with the banknote, and then towards a dispensing location. This gearing is powered by the AC motor.

In use, when cash is to be dispensed from the system of FIG. 1, the motor is switched on and all of the pumps are run simultaneously. Because the motor also powers the gearing, this means that all of the gearing is caused to move. Once the pump is running, one of the valves is opened so that air is drawn through the associated pickline. The end of the pickline, which usually carries a suction cap, is then is moved towards the banknote until it is in contact therewith. As described previously, this causes the banknote to stick to the cap so that it can be removed under the action of the vacuum.

FIG. 2 shows another known arrangement. In this, a single pump driven by a single motor is used to create a pressure difference in a selected one of the pick-up lines and drive a gearing mechanism for moving the pickline between pick-up and release positions. Each of the picklines is provided as a separate branch of a single line that is connected directly to the pump. Provided in each pickline is a solenoid valve. By selectively opening and closing the solenoid valves as appropriate, a selected one of the picklines can be exposed to the pump and so used for a pick and place action. In use, the motor is switched on to power the pump. Because the motor also powers the gearing, this means that all of the gearing is caused to move. Once the pump is running, one of the valves is opened so that air is drawn through the associated pickline and the suction cap on the line is moved towards the banknote until it is moved into contact therewith, and removed as described previously.

Various problems arise with the arrangements of FIGS. 1 and 2. For example, a relatively large AC motor is needed, which reduces the level of control that can be exercised. Also, because all the pumps are run simultaneously, the power requirements, and so operational costs, are relatively high. In addition, because all of the gearing is run when the motor is on, this means that wear can be significant. Furthermore, both of the systems of FIGS. 1 and 2 require a solenoid valve in each pickline. Since solenoid valves can be difficult to control, this increases the complexity of the system.

SUMMARY OF THE INVENTION

An object of the present invention is to provide an improved mechanism for dispensing banknotes from a self-service terminal.

According to one aspect of the invention there is provided a self-service machine, such as an automated teller machine, that includes a plurality of valveless vacuum pick mechanisms for picking media, such as banknotes, each valveless vacuum pick mechanism including a pump, a pickline connected the pump, a drive mechanism for moving at least a portion of the pickline between a media pick position and a media release position, and a motor for driving both the pump and the drive mechanism.

By providing each of the plurality of vacuum pick mechanisms with an individual pump and a separate motor, the need for valves can be avoided, and wear on the drive system can be reduced.

The pump may be a single stroke pump, preferably a synchronous stroke pump. The drive mechanism may be operable to move the pickline and a piston of the stroke pump. The drive mechanism may be operable to move the pickline between a media pick position and a media release position and back again in a single pump stroke cycle. The motor may be a stepper motor.

According to another aspect of the invention, there is provided a valveless vacuum pick mechanism for picking media, such as banknotes, including a pump, a valveless pickline connected to the pump, a drive mechanism for moving the pickline between a media pick position and a media release position, and a motor for driving both the pump and the drive mechanism.

The pump may be a single stroke pump, preferably a synchronous stroke pump. The drive mechanism may be operable to move the pickline and a piston of the stroke pump. The drive mechanism may be operable to move the pickline between the media pick and release positions and back again in a single pump stroke cycle. The motor may be a stepper motor.

BRIEF DESCRIPTION OF THE DRAWINGS

Various aspects of the invention will now be described by way of example only and with reference to the accompanying drawings, of which:

FIG. 4 is a plan view of the mechanism of FIG. 3;

FIGS. 7(*a*), (*b*) and (*c*) are front isometric, back isometric and side views respectively of a cam cluster for use in a drive mechanism for the valveless pick mechanism of FIG. 3;

DETAILED DESCRIPTION

Figure 1:
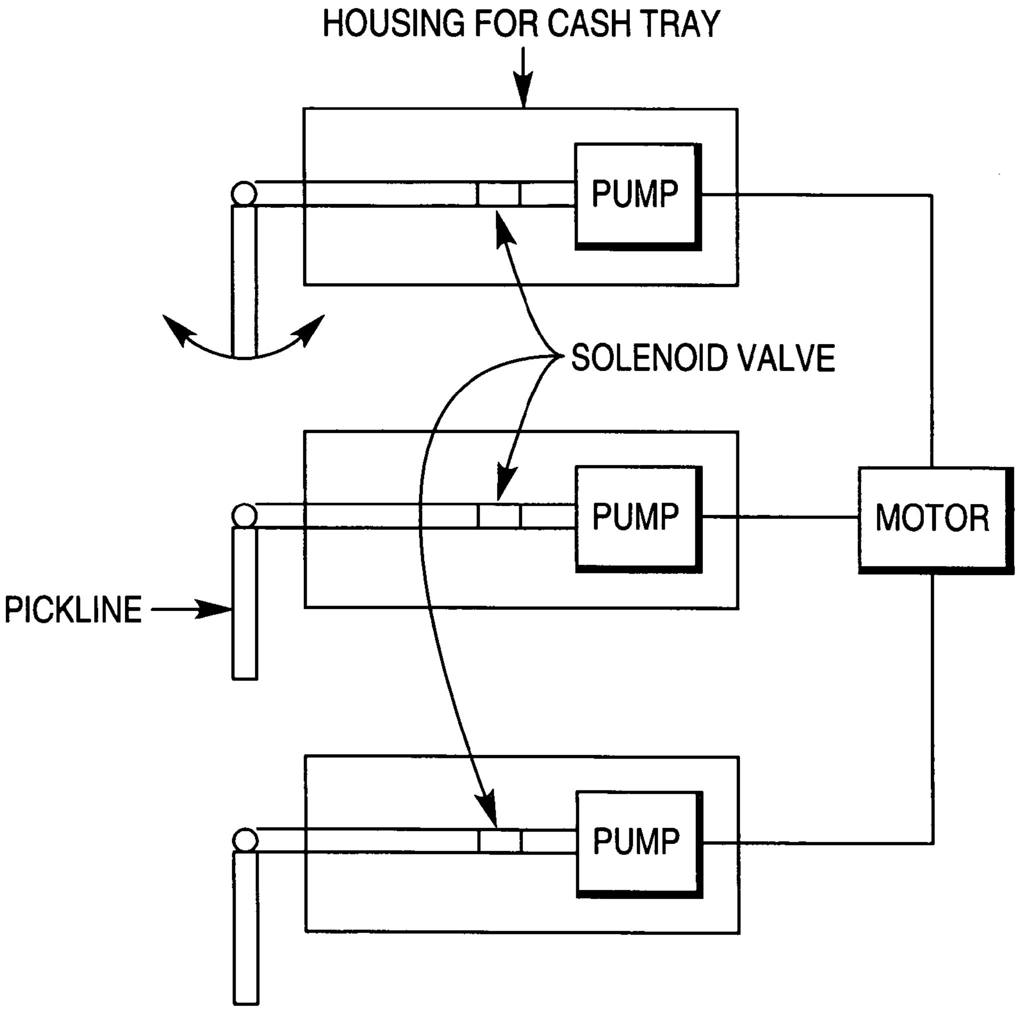
FIG. 1 PRIOR ART
FIG. 1 is a view of a known vacuum-based picking system.
Figure 2:
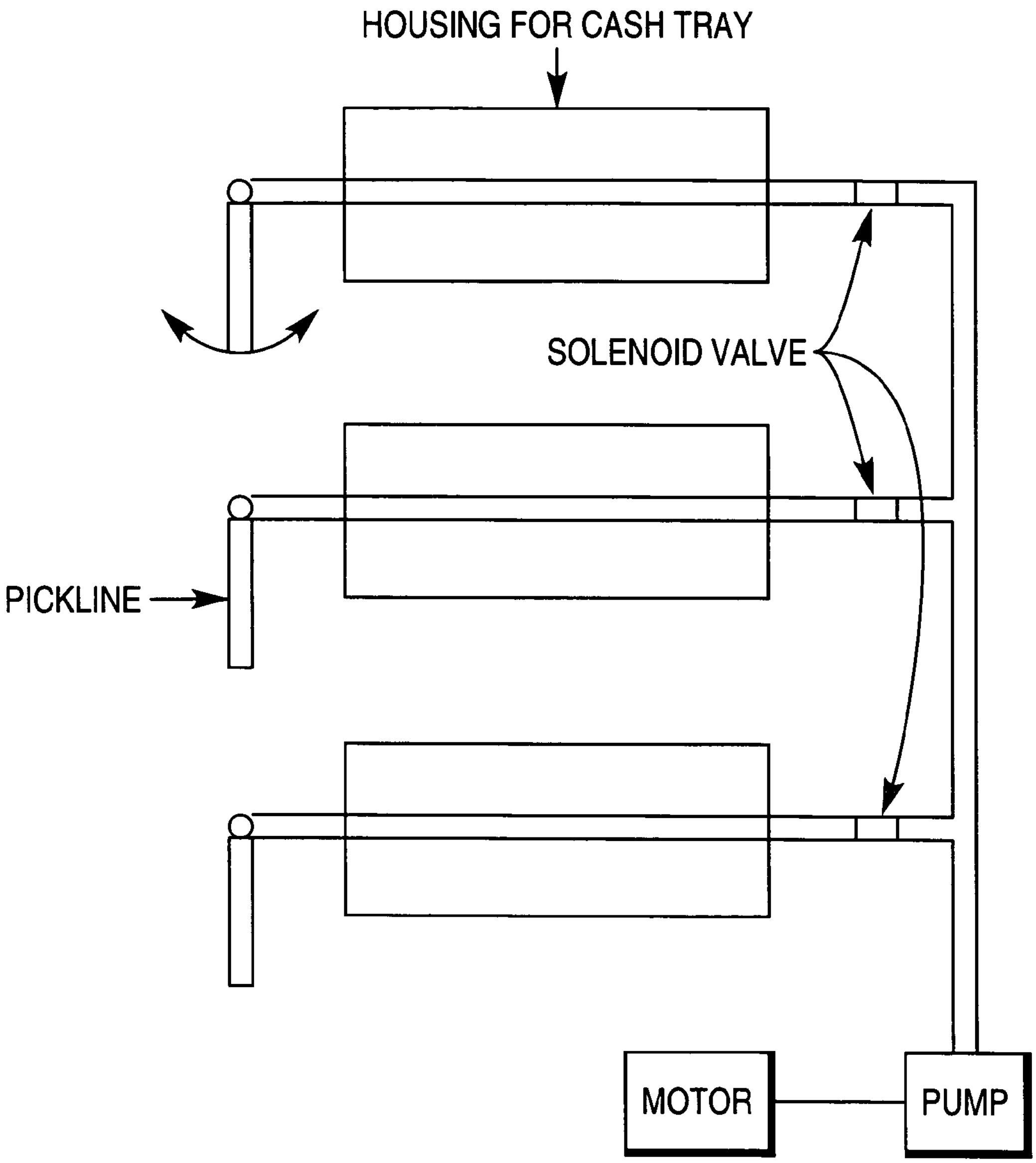
FIG. 2 PRIOR ART
FIG. 2 is a view of another known vacuum-based picking system.

FIGS. 3 to 6 show a vacuum pick mechanism 10 for picking a banknote 12 individually from a bundle 14 of such notes in a dispensing cassette 16 and forwarding that note 12 to another part of the dispenser. For the sake of clarity, only a single mechanism 10 is shown. However, it will be appreciated that in, for example, an ATM environment, a plurality of these would be stacked on top of each other.

The vacuum pick mechanism 10 of FIGS. 3 to 6 is carried on a support or housing of a cash dispensing cassette 16. It includes a single stroke pump 18, the output of which is connected directly to a pickline 20 that has a flexible tube portion 22 and a rotatable, rigid tube 24 that carries two downwardly extending pick-up members 26 (only one shown) at the ends of which are provided suction cups 28. Formed through the rigid tube 24 and each of the pick up members 26 are channels that open into the suction cups 28, so that a clear, valveless fluid flow path is provided between the pump 18 and the suction cups 28. As can be seen most clearly in FIG. 4, the rigid tube 24 is positioned substantially parallel to the dispensing end of the cassette 16, so that in use both the suction cups 28 can be moved into contact with a front one of the notes in the cassette 16.

Figure 5:
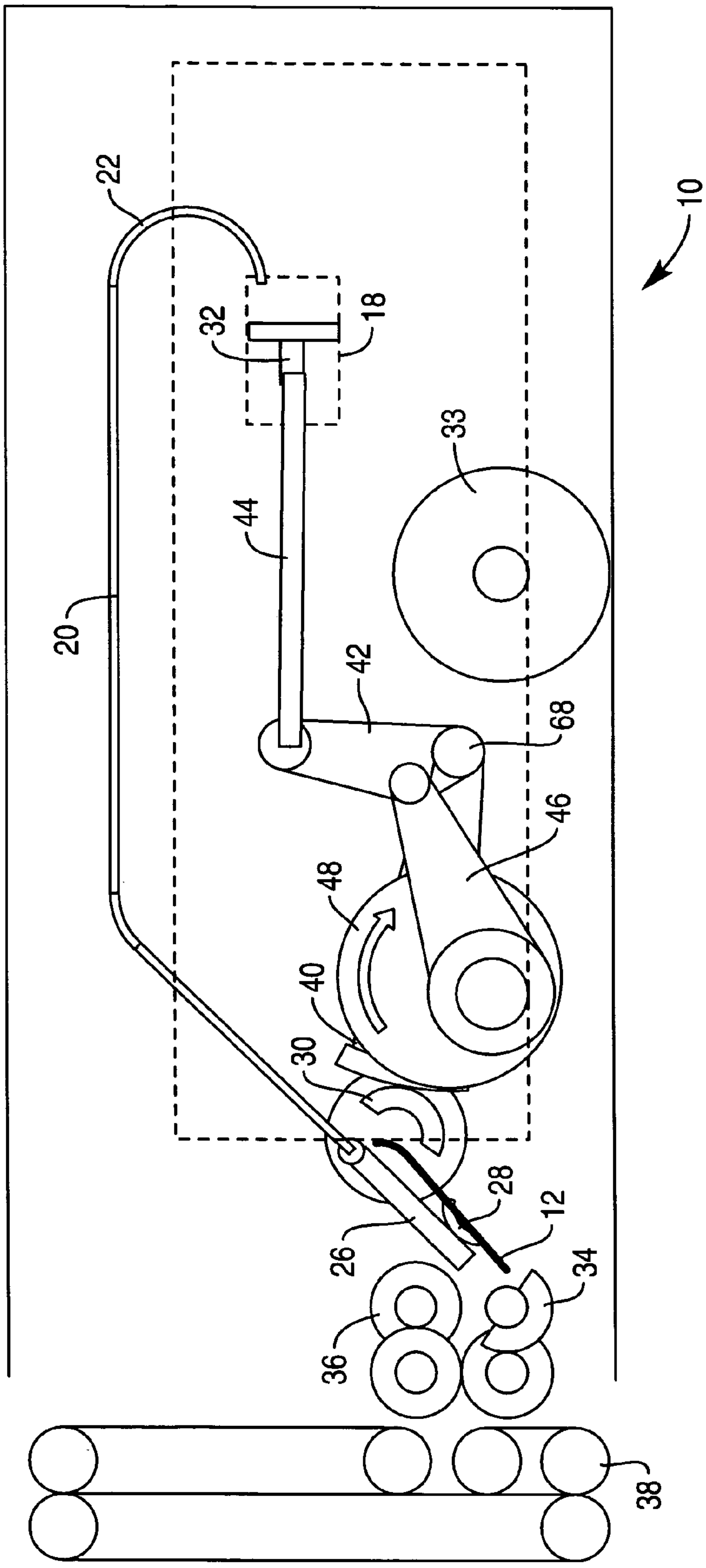
FIG. 5 is a schematic view of the valveless pick mechanism of FIG. 3 in a second position.

To move the suction cups 28 between a pick position and a release position, connected to one end of the rigid tube 24 is a gear 30 of a drive mechanism. This drive mechanism is also connected to the piston 32 of the single stroke pump 18 and is powered by a stepper motor 33. The drive mechanism is operable to move the piston 32 of the pump 18 and at the same time cause the rigid tube 24 to move the suction cups 28 close to or into engagement with a banknote in the dispensing cassette 16. Stroking of the piston 32 creates enough of a pressure difference to cause the banknote 12 to stick to the cups 28. As shown in FIG. 5, continued action of the drive causes movement of the suction cups 28 and the note 12 away from the pick position towards a release position, in which the note 12 can be caught in take-away pinch rollers 34, 36 of a dispensing mechanism.

Figure 3:
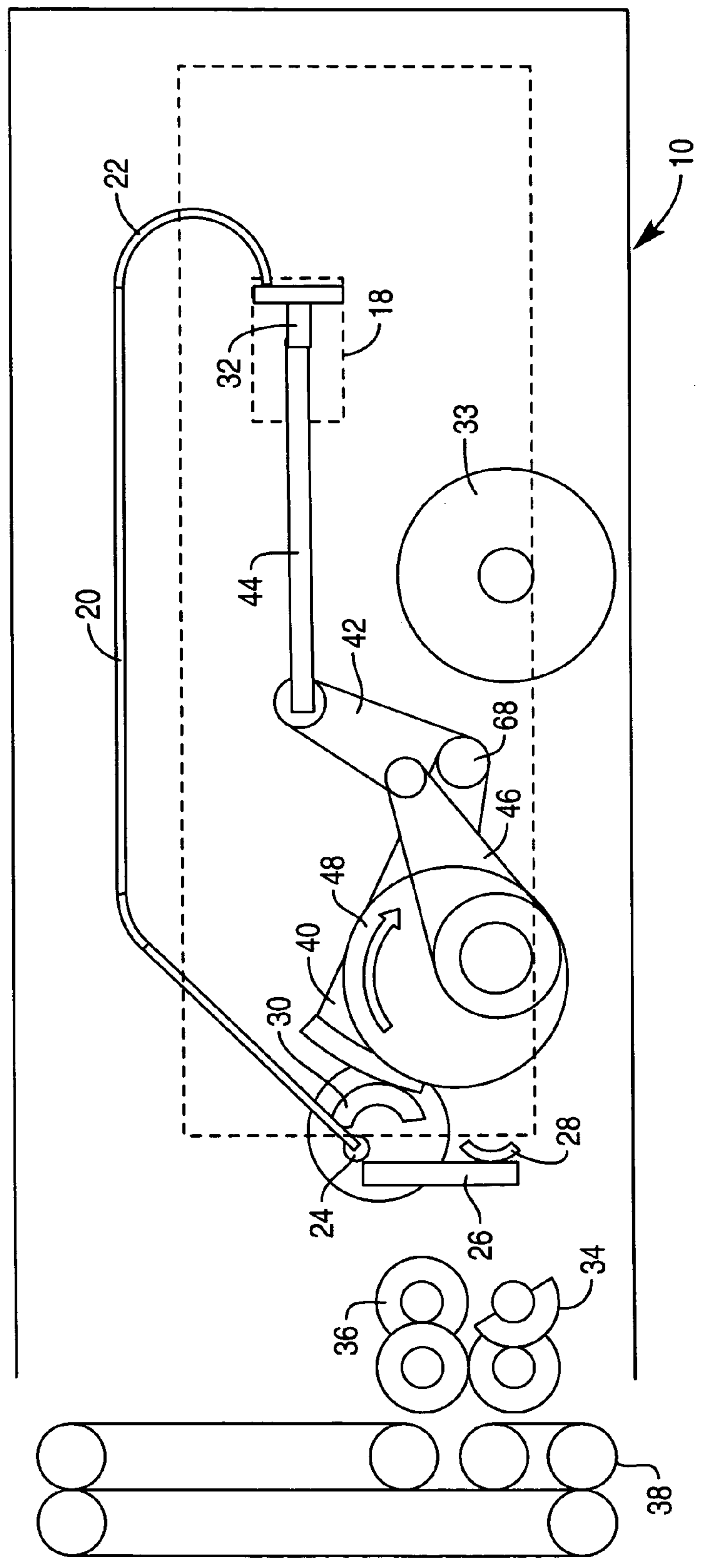
FIG. 3 is a schematic view of a valveless pick mechanism in a first position.
Figure 6:
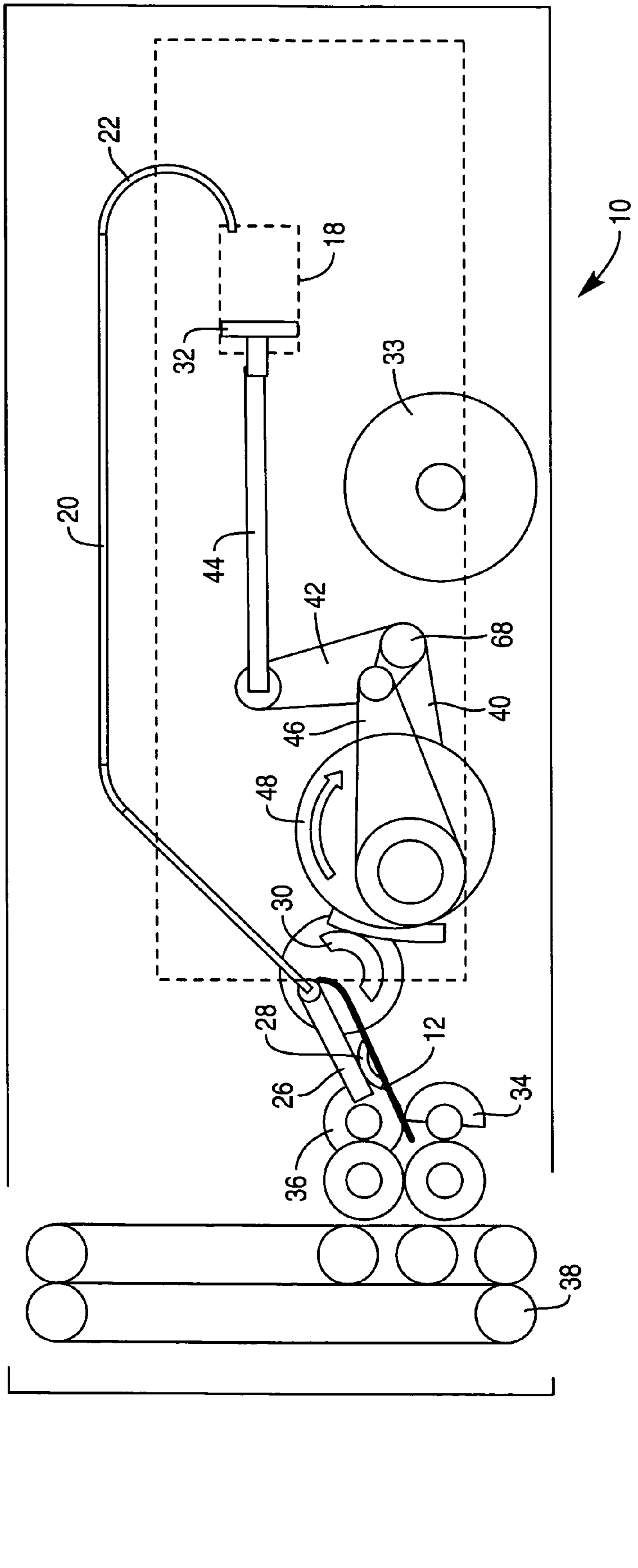
FIG. 6 is a schematic view of the valveless pick mechanism of FIG. 3 in a third position.

The pinch rollers 34, 36 of the dispensing mechanism are driven by the stepper motor 33, so that they can be moved between a rest position and a gripping position in an appropriate sequence timed to correspond with the movement of the suction caps 28 between the pick up and release positions. As shown in FIGS. 3, 5 and 6, one of the pinch rollers 34 has a D-shaped cross section and the other 36 has a circular cross-section. When the motor 33 is switched on initially, the D-shaped roller 34 is located half a turn away from a gripping position in which it co-operates with the other roller 36 to grip the banknote. Rotation of the semi-circular roller 34 by substantially half a turn is timed to correspond with movement of the banknote 12 into the area between the rollers 34 and 36, so that it can be gripped therebetween, as shown in FIG. 6.

The timing of the drive mechanism is such that when the banknote 12 is gripped by the rollers 34 and 36, the return stroke of the piston 32 starts. This allows the pressure difference between the pickline 20 and ambient to be gradually reduced, which in turn reduces the hold on the note 12. This allows the note 12 to be removed from the cups 28 by the rollers 34 and 36. Continued movement of the drive rotates the semi-circular roller 34 by another half turn thereby to pass the note 12 onto the next stage of the dispensing mechanism, typically a vertical transport system 38, and return the D-shaped roller 34 to its starting position. At the same time, this continued movement of the drive returns the suction cups 28 and the pump piston 32 to their starting positions. In this way, with each cycle of the piston 32, a single note 12 can be picked from the cassette 16, and moved to the transport mechanism 38, and the drive, piston 32 and dispensing gear 34 and 36 can be returned to positions ready for re-use.

As will be appreciated various different drive mechanisms could be used. An example of a suitable such mechanism will now be described in more detail. This includes a pickline drive segment 40 for moving the rigid pickline tube 24, and so the suction cups 28, a pump rod arrangement 42, 44 and 46 for driving the piston 32 of the pump 18 and a cluster cam 48 for driving each of the pickline drive segment 40 and the pump rod arrangement 42, 44 and 46.

Figure 8A:
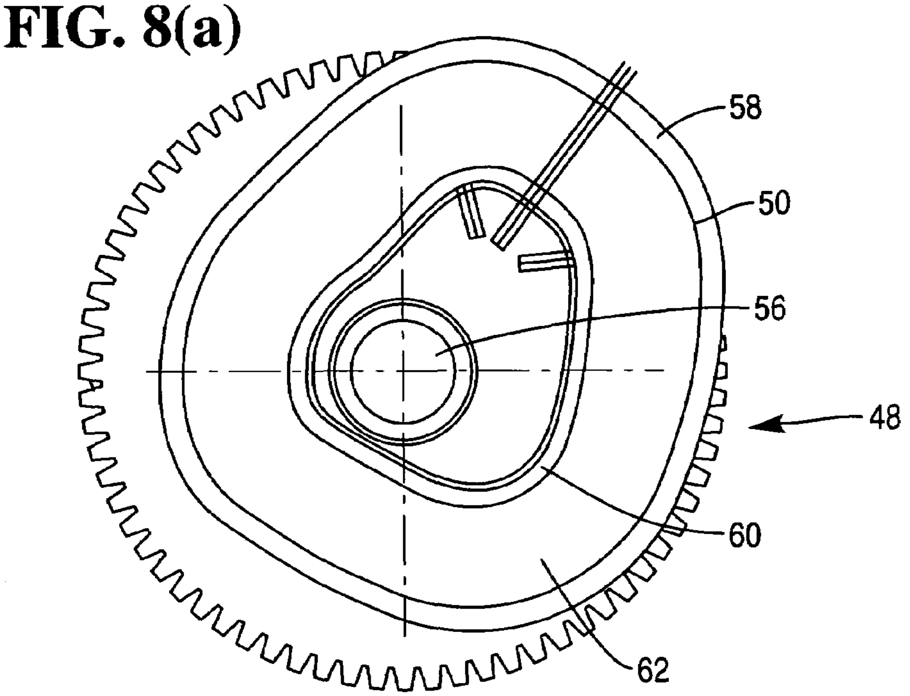
FIGS. 8(*a*) and (*b*) are front and rear plan views respectively of the cam cluster of FIG. 7.
Figure 8B:
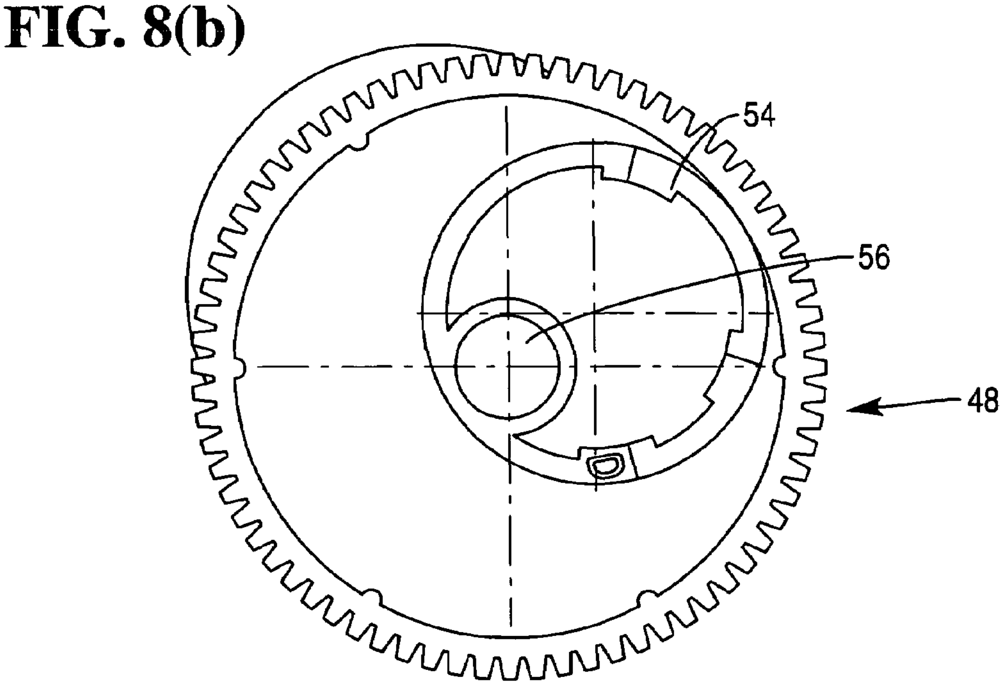

FIGS. 7 and 8 shows various views of the cluster cam 48. This includes a pickline cam 50, a circular drive gear 52 and a pump drive cam 54. Typically all parts of the cluster cam 48 are integrally formed. Defined through the centre of the cluster 48 and concentric with the drive gear 52 is a hole 56 for receiving a shaft, about which the cluster cam 48 can be driven by engagement of the drive gear 52 with a corresponding gear mechanism (not shown) driven by the stepper motor 33. Of course, any other suitable arrangement for coupling to the motor 33 could be used.

Figure 9:
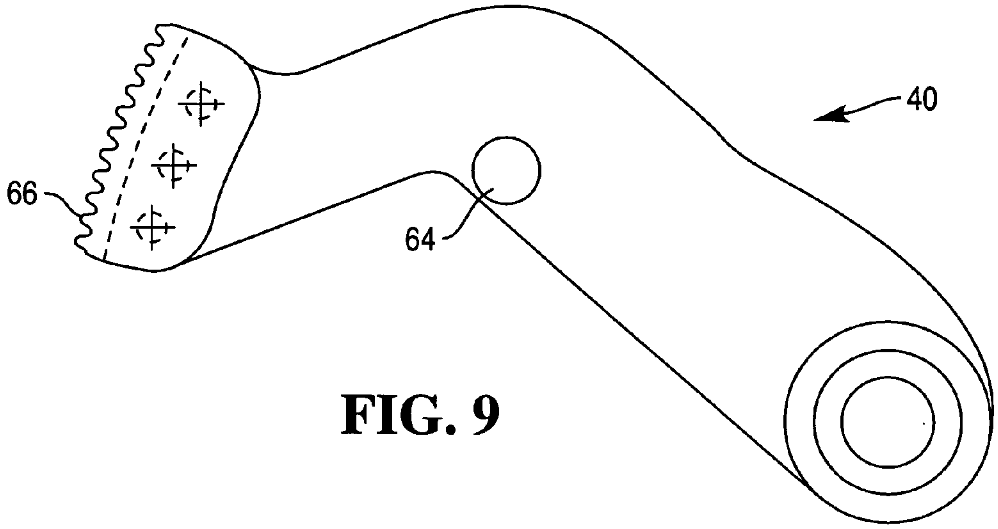
FIG. 9 is a plan view of a drive arm for use in the arrangement of FIG. 3.

FIGS. 7(*a*) and 8(*a*) show the pickline cam 50. This has a smooth edged triangular shape defined by an external ridge 58, and is positioned so that one of its smooth corners protrudes beyond the edge of the circular drive gear 52. Formed inwardly of the external ridge 58 is a correspondingly shaped internal ridge 60, the internal and external ridges defining a cam track 62 between them. The cam track 62 is shaped and sized to receive a roller 64 that projects from a surface of the pickline drive arm 40, as shown in FIG. 9. This arm 40 is pivoted co-axially with one end of the pump crank arm 42 that is connected at its other end by a rod 44 to one end of the piston 32 of the pump 18. At the other end of the pickline drive arm 40 is formed a gear 66 for meshing with the gear 30 carried on the rigid tube 24 of the pickline 20. One cycle of rotation of the cluster cam 48 by the motor 33 causes movement of the arm gear 40 into engagement with the gear 30 on the rigid tube 24 and so rotation of the suction caps 28 away from the pick up position and towards the release position. Continued rotation of the cam 48 causes the suction pads 28 to be rotated back to their starting position.

FIGS. 7(*b*) and 8(*b*) show the eccentric pump drive cam 54. This has a circular cross-section and is positioned offset relative to the centre of the cluster 48. Pivotally mounted on the pump cam 54 is a drive rod 46 that is fixedly connected at its other end to the pump crank arm 42, at a position above and offset from the common pivot point 68 with the pickline arm 40. Rotation of the cam cluster 48 causes the end of the pump drive arm 40 to follow an eccentric revolution path, which in conjunction with the action of the pump crank arm 42, causes the pump piston 32 to be moved rearwardly and then returned to a starting position in a single cycle of the cluster 48. In this way, the application of a pressure difference to hold a banknote against the suction cups 28 is timed to coincide with movement of those cups from a pick-up position to a release position. Likewise, release of the pressure difference in the return stroke of the piston 18 is timed to coincide with movement of the cups from the release position to the pick-up or re-start position. Hence in one stroke and return cycle of the pump piston 18 a banknote 12 can be picked from the dispensing cassette 16 and transferred to a dispensing mechanism 38.

Figure 10:
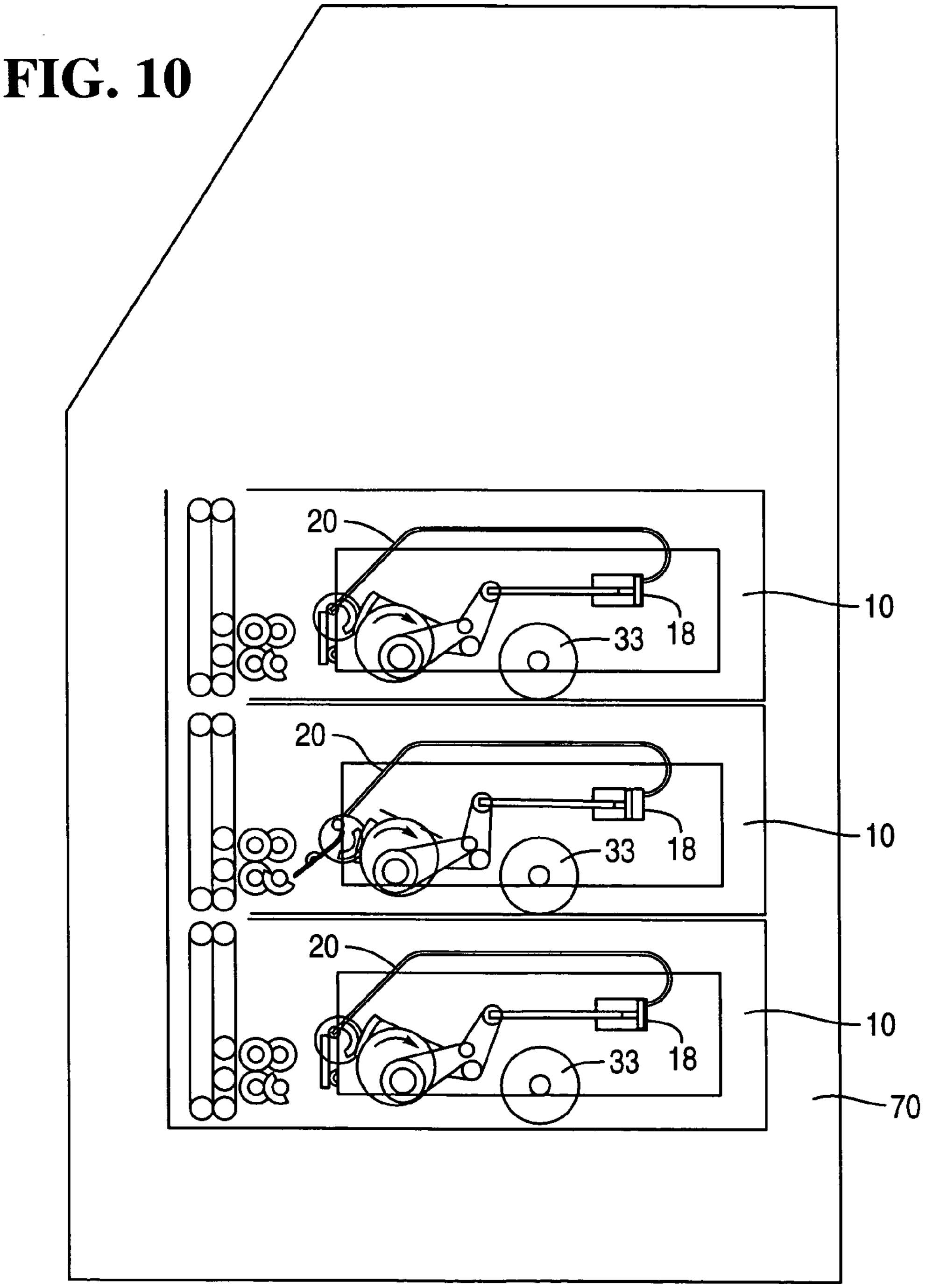
FIG. 10 is a schematic view of an automated teller machine that includes a plurality of the valveless pick mechanisms of FIG. 3.

The vacuum pick mechanism in which the invention is embodied is simple and effective. Also, because each mechanism in a stack can be independently constructed, it allows a modular approach to building ATMs or other self-service terminals, as shown in FIG. 10. By avoiding the need for valves, control and timing of the drive and pump can be done mechanically, which simplifies the process and makes it more reliable. Furthermore, the overall design reduces the number of components needed, which is advantageous in an ATM environment where space is generally very restricted.

A skilled person will appreciate that variations of the disclosed arrangements are possible without departing from the invention. For example whilst the invention is described primarily with reference to banknotes, it will be appreciated that other media could be dispensed using this mechanism, such as tokens or vouchers or tickets or any other sheet of material. In addition, although an arrangement for triggering the start of a pick-up action has not been explicitly described, suitable techniques are well known in the art. Accordingly, the above description of a specific embodiment is made by way of example only and not for the purposes of limitations. It will be clear to the skilled person that minor modifications may be made without significant changes to the operation described.

What is claimed is:

1. A currency picking system for an Automated Teller Machine, ATM, comprising:

a) a pick-up member (26) which
  i) is attached to, and rotates with, a driven gear (30),
  ii) supports vacuum cups (28) which grasp banknotes,
b) a rotatable member (52);
c) a first linkage, driven by the rotatable member (52), which rotates the driven gear (30) and the pick-up member (26) alternately between
  i) a pick up position, wherein banknotes are picked from a supply, and
  ii) a release position;
d) a second linkage, driven by the rotatable member (52), which induces a pump (18) to
  i) apply vacuum to the vacuum cups (28) when at the pick position, and
  ii) reduce vacuum applied to the vacuum cups (28) when at the release position.

2. System according to claim 1, wherein no valves are used in application of, or reduction of, the vacuum.

3. System according to claim 1, wherein the first linkage comprises:

i) a cam track (62) on the rotatable member (52), which rotates when the rotatable member (52) rotates;
ii) a cam roller (64) which follows the cam track (62) when the rotatable member (48) rotates;
iii) a drive arm (40) connected to the cam roller (64), such that movement of the cam roller (64) along the cam track (62) causes the drive arm (40) to pivot between first and second positions about a pivot point (68), iv) a drive gear (66) attached to the drive arm (40), which drive gear (66) pivots about the pivot point (68) when the drive arm (40) pivots, and which drives the driven gear (30).

4. System according to claim 1, wherein the second linkage comprises:

i) a drive rod (46) driven by the rotatable member (52);
ii) a pump (18) connected to the drive rod (46); and
iii) tubes (20, 22) connecting between the pump (18) and the suction cups (28), wherein (A) the pump (18) applies suction to the vacuum cups (28) when the pick-up member (26) is in the pick up position and (B) the pump (18) reduces suction when the pick-up member (26) is in the release position.

5. System according to claim 4, wherein the rotatable member (52) comprises a gear, the cam track (62) is located on one side of the gear, and the drive rod (46) is pivotally connected to the gear on its other side.

6. A picking system for an Automated Teller Machine, ATM, comprising:

a) a rotatable member (52);
b) a conversion system which converts rotary motion of the rotatable member (52) into oscillatory motion of a drive gear (66);
c) a driven gear (30), driven by the drive gear (66);
d) a pick-up member (26) which
  i) is attached to the driven gear (30),
  ii) supports vacuum cups (28) which pick banknotes,
  iii) is induced by the oscillatory motion to rotate between
    A) a pick up position, wherein banknotes are picked up from a cassette, and
    B) a release position;
e) a pump (18), linked to a crank (54) on the rotatable member (52), which
  i) applies vacuum to the vacuum cups when the pick-up member (26) is in the pick up position, and
  ii) reduces vacuum when the pick-up member is in the release position.

7. A system according to claim 6, wherein the conversion system comprises:

i) a cam track (62) on the rotatable member (52), which rotates when the rotatable member (52) rotates;
ii) a cam roller (64) which follows the cam track (62) when the rotatable member (48) rotates;
iii) a drive arm (40) connected to the cam roller (64), such that movement of the cam roller (64) along the cam track (62) causes the drive arm (40) to pivot between first and second positions about a pivot point (68), wherein the drive gear (66) is attached to the drive arm (40), and pivots about the pivot point (68) when the drive arm (40) pivots.

8. An Automated Teller Machine, ATM, comprising:

a) a first picking system, which uses vacuum cups to grasp banknotes, wherein a single first source of mechanical power
  i) moves a first currency picker to a pick up position at a first supply of banknotes;
  ii) induces a stroke in a first piston pump, to create vacuum in the first picker;
  iii) moves the first picker to a first release position; and
  iv) induces a release stroke in the first piston pump, to reduce vacuum in the first picker; and
b) a second picking system, which uses vacuum cups to grasp banknotes, wherein a single second source of mechanical power i) moves a second currency picker to a pick up position at a second supply of banknotes;

ii) induces a stroke in a second piston pump, to create vacuum in the second picker;

iii) moves the second picker to a second release position; and iv) induces a release stroke in the second piston pump, to reduce vacuum in the second picker, wherein the first picking system handles banknotes of one denomination, and the second picking system handles sheets different from said banknotes of one denomination.

9. ATM according to claim 8, wherein the sheets different from said banknotes of one denomination comprise banknotes of a different denomination.

* * * * *